US012699438B2

(12) United States Patent
Hsu

(10) Patent No.: US 12,699,438 B2
(45) Date of Patent: Aug. 4, 2026

(54) ELECTRIC ENERGY MANAGEMENT DEVICE, ELECTRIC ENERGY MANAGEMENT SYSTEM AND ELECTRIC ENERGY MANAGEMENT METHOD FOR CONTROLLING CURRENT BALANCE

(71) Applicant: Wistron Corporation, New Taipei City (TW)

(72) Inventor: Kuan-Wei Hsu, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 125 days.

(21) Appl. No.: 18/741,754

(22) Filed: Jun. 12, 2024

(65) Prior Publication Data

US 2025/0271924 A1 Aug. 28, 2025

(30) Foreign Application Priority Data

Feb. 26, 2024 (TW) ................................. 113106718

(51) Int. Cl.
*G06F 1/00* (2006.01)
*G06F 1/26* (2006.01)
*G06F 1/28* (2006.01)
*G06F 1/3296* (2019.01)

(52) U.S. Cl.
CPC ............ *G06F 1/3296* (2013.01); *G06F 1/263* (2013.01); *G06F 1/28* (2013.01)

(58) Field of Classification Search
CPC ............. G06F 1/296; G06F 1/263; G06F 1/28
See application file for complete search history.

(56) References Cited

U.S. PATENT DOCUMENTS

| | | | | |
|---|---|---|---|---|
| 5,956,221 A | * | 9/1999 | Zuzuly | H02H 3/006 361/87 |
| 11,637,430 B2 | | 4/2023 | Xiong et al. | |
| 2016/0178020 A1 | * | 6/2016 | Masuda | F16D 55/225 188/162 |
| 2019/0369080 A1 | * | 12/2019 | Yanagawa | C25F 3/12 |
| 2021/0359524 A1 | * | 11/2021 | Xiong | H02M 1/007 |
| 2023/0308009 A1 | * | 9/2023 | Yu | H02J 3/381 |
| 2025/0392237 A1 | * | 12/2025 | Zhang | H02P 1/04 |

FOREIGN PATENT DOCUMENTS

CN 111510001 8/2020

OTHER PUBLICATIONS

Constantinos A. Balaras et al., "High Performance Data Centers and Energy Efficiency Potential in Greece", Procedia Environmental Sciences, Apr. 2017, pp. 107-114, vol. 38.

* cited by examiner

*Primary Examiner* — Mohammed H Rehman
(74) *Attorney, Agent, or Firm* — JCIPRNET

(57) ABSTRACT

An electric energy management device, an electric energy management system, and an electric energy management method for controlling a current balance are provided. The electric energy management device includes a sensing unit and a management unit. The sensing unit senses a first phase current value, a second phase current value, and a third phase current value. The management unit obtains a current unbalance value between the first phase current value, the second phase current value, and the third phase current value, and changes the operating quantities of first PSUs, second PSUs, and third PSUs of the server devices in response to the current unbalance value being higher than a threshold.

18 Claims, 6 Drawing Sheets

$110\_1$: $I1R1$, $I1S1$, $I1T1$, $I1R2$, $I1S2$, $I1T2$ $110\_2$: $I2R1$, $I2S1$, $I2T1$, $I2R2$, $I2S2$, $I2T2$ $\vdots$              $\vdots$ $110\_n$: $InR1$, $InS1$, $InT1$, $InR2$, $InS2$, $InT2$ $ITR = I1R1 + I1R2 + I2R1 + I2R2 + \ldots + InR1 + InR2$ $ITS = I1S1 + I1S2 + I2S1 + I2S2 + \ldots + InS1 + InS2$ $ITS = I1T1 + I1T2 + I2T1 + I2T2 + \ldots + InT1 + InT2$

FIG. 4

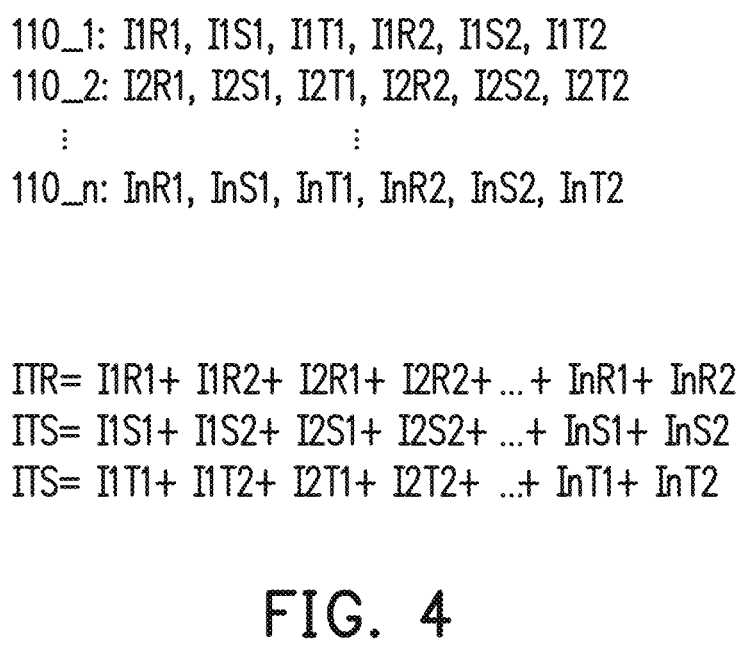

ELECTRIC ENERGY MANAGEMENT DEVICE, ELECTRIC ENERGY MANAGEMENT SYSTEM AND ELECTRIC ENERGY MANAGEMENT METHOD FOR CONTROLLING CURRENT BALANCE

CROSS-REFERENCE TO RELATED APPLICATION

This application claims the priority benefit of Taiwan application serial no. 113106718, filed on Feb. 26, 2024. The entirety of the above-mentioned patent application is hereby incorporated by reference herein and made a part of this specification.

BACKGROUND

Field of the Disclosure

The present disclosure relates to an electric energy management device, an electric energy management system and an electric energy management method, and in particular, to an electric energy management device, an electric energy management system and an electric energy management method for controlling current balance.

Description of Related Art

Generally speaking, a field (e.g., a data center, a factory, a building, or a town) receives three-phase AC power supply from a power plant or grid and is operated by using the three-phase AC power supply. There are multiple facilities in the field. For example, a first facility is operated by using the first phase AC power supply among the three-phase AC power supply. The second facility is operated by using the second phase AC power supply among the three-phase AC power supply. The third facility is operated by using the third phase AC power supply among the three-phase AC power supply. In addition, the fourth facility is operated by using the first phase AC power supply, the second phase AC power supply, and the third phase AC power supply among the three-phase AC power supply.

It should be noted that when the loads of multiple facilities at the field change, the currents between the three-phase AC power supply will become unbalanced. Once the current imbalance between the three-phase AC power supply occurs, the current value of a single phase among the first phase AC power supply, the second phase AC power supply and the third phase AC power supply will be increased. As a result, power consumption will increase significantly. Moreover, an increase in the current value of a single phase might result in a risk of electrical tripping. Accordingly, it may be obtained that how to control the current balance at a field is one of the issues to be solved by of those skilled in the art.

SUMMARY OF THE DISCLOSURE

The present disclosure provides an electric energy management system and an electric energy management method for controlling current balance.

In an embodiment of the disclosure, an electric energy management device includes a sensing unit and a management unit. The sensing unit senses a first phase current value, a second phase current value and a third phase current value. The management unit is coupled to the sensing unit. The management unit obtains a current unbalance value between the first phase current value, the second phase current value, and the third phase current value, and changes the operating quantities of at least one first power supply unit, at least one second power supply unit and at least one third power supply unit of a plurality of server devices in response to the current unbalance value being higher than a threshold.

An electric energy management method of the embodiment of the present disclosure includes: receiving a first phase current value, a second phase current value and a third phase current value; obtaining a current unbalance value between the first phase current value, the second phase current value, and the third phase current value; and changing the operating quantities of at least one first power supply unit, at least one second power supply unit, and at least one third power supply unit in a plurality of server devices in response to the current unbalance value being higher than a threshold.

The electric energy management system of the embodiment of the present disclosure includes a plurality of server devices and an electric energy management device. The plurality of server devices include at least one first power supply unit, at least one second power supply unit and at least one third power supply unit. The at least one first power supply unit supplies power by using the first phase power supply. The at least one second power supply unit supplies power by using the second phase power supply. The at least one third power supply unit supplies power by using the third phase power supply. The electric energy management device includes a sensing unit and a management unit. The sensing unit senses the first phase current value of the first phase power supply, the second phase current value of the second phase power supply and the third phase current value of the third phase power supply. The management unit is coupled to the sensing unit. The management unit obtains a current unbalance value between the first phase current value, the second phase current value, and the third phase current value, and changes operating quantities of the at least one first power supply unit, the at least one second power supply unit and the at least one third power supply unit in the plurality of server devices in response to the current unbalance value being higher than a threshold.

Based on the above, when the current unbalance value is higher than the threshold, it means that the currents of the first phase power supply, the second phase power supply and the third phase power supply at a field are in an unbalanced state. Under such condition, the electric energy management system and the electric energy management method change the operating quantities of the plurality of first power supply units, the plurality of second power supply units, and the plurality of third power supply units to improve the balance of currents.

BRIEF DESCRIPTION OF THE DRAWINGS

FIG. 4 is a schematic view of calculation of a current value of a server device according to an embodiment of the present disclosure.

DESCRIPTION OF EMBODIMENTS

Figure 1:
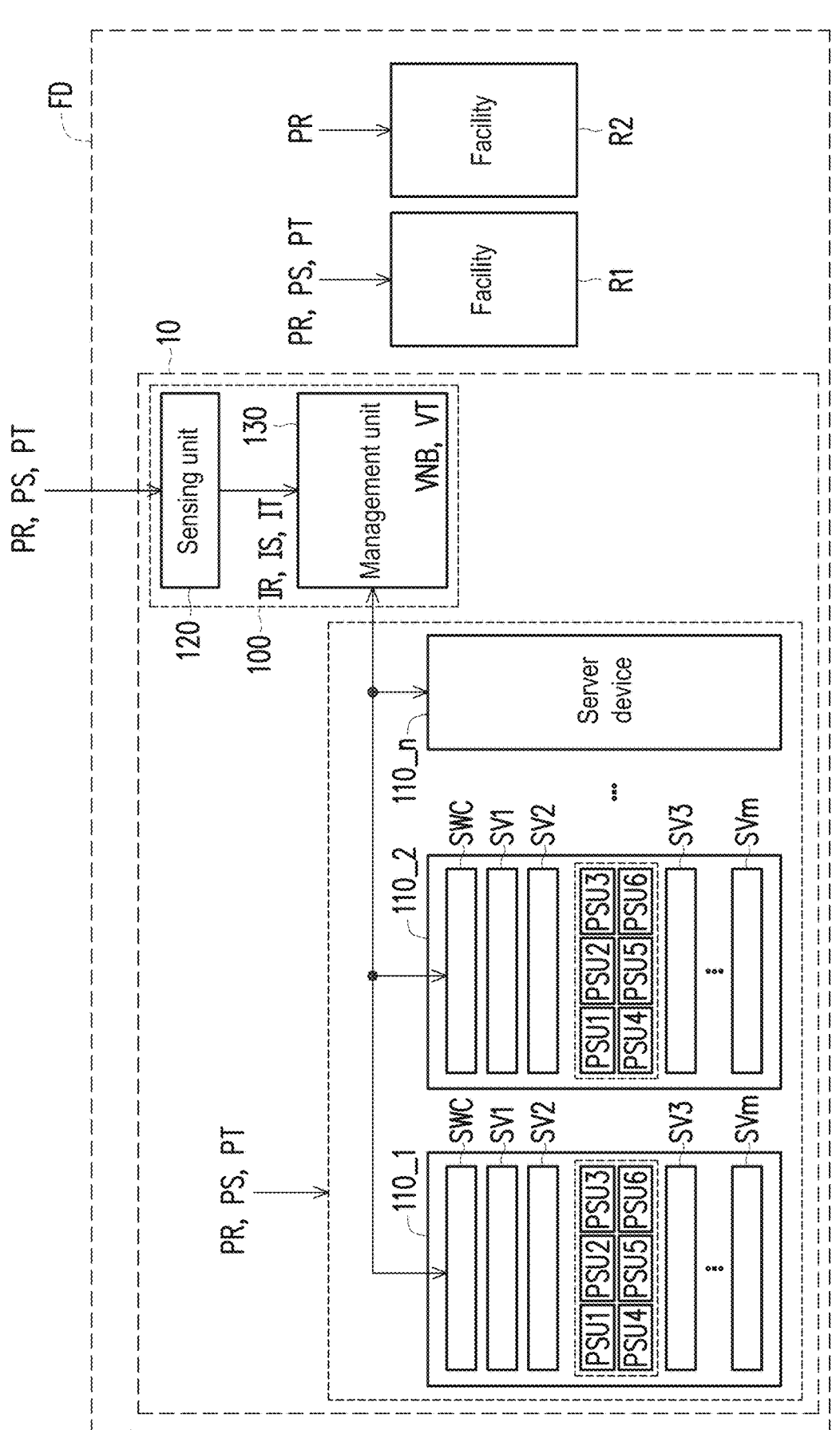
FIG. 1 is a schematic view of an electric energy management system according to an embodiment of the present disclosure.

Some embodiments of the present disclosure will be described in detail with reference to the accompanying drawings. The reference numerals cited in the following description will be regarded as the same or similar components when the reference numerals appear in different drawings. These embodiments are only part of the present disclosure and do not disclose all possible implementations of the present disclosure. Rather, these embodiments are only examples within the scope of the claims of the disclosure.

Please refer to FIG. 1. FIG. 1 is a schematic view of an electric energy management system according to an embodiment of the present disclosure. In an embodiment, the electric energy management system 10 is disposed to control the current balance in a field FD. The electric energy management system 10 includes an electric energy management system 100 and server devices 110_1 to 110_n. The server devices 110_1 to 110_n may be server racks respectively. The electric energy management system 100 includes a sensing unit 120 and a management unit 130. The server devices 110_1 to 110_n are disposed in the field FD. The server devices 110_1 to 110_n each include at least one first power supply unit, at least one second power supply unit and at least one third power supply unit. Each of the at least one first power supply unit supplies power by using a first phase power supply PR in the field FD. Each of the at least one second power supply unit supplies power by using a second phase power supply PS in the field FD. Each of the at least one third power supply unit supplies power by using a third phase power supply PT in the field FD. The field FD further includes facilities R1 and R2. The facility R1 may be, for example, a heating, ventilation, and air conditioning (HVAC) facility or an office facility. The facility R2 may, for example, be other facilities. The facility R1 may be operated based on the first phase power supply PR, the second phase power supply PS and the third phase power supply PT. In other words, the facility R1 is operated based on three-phase power supply. The facility R2 may be operated based on the first phase power supply PR (the disclosure is not limited thereto). In other words, the facility R2 is operated based on single-phase power supply. The server devices 110_1 to 110_n are information technology (IT) facilities in the field FD.

In an embodiment, the server device 110_1 includes first power supply units PSU1 and PSU4, the second power supply units PSU2 and PSU5, the third power supply units PSU3 and PSU6 as well as servers SV1 to SVm. The first power supply units PSU1 and PSU4, the second power supply units PSU2 and PSU5, and the third power supply units PSU3 and PSU6 of the server device 110_1 may be disposed in the same power supply unit shelf. The first power supply units PSU1 and PSU4 supply power to the servers SV1 to SVm by using the first phase power supply PR. The second power supply units PSU2 and PSU5 supply power to the servers SV1 to SVm by using the second phase power supply PS. The third power supply units PSU3 and PSU6 supply power to the servers SV1 to SVm by using the third phase power supply PT. The configuration of the server devices 110_2 to 110_n is similar or identical to the above configuration example of the server device 110_1, so related details will not be repeated here.

In an embodiment, the sensing unit 120 is disposed in the field FD. The sensing unit 120 senses the first phase current value IR of the first phase power supply PR, the second phase current value IS of the second phase power supply PS, and the third phase current value IT of the third phase power supply PT. The management unit 130 is coupled to the server devices 110_1 to 110_n and the sensing unit 120. The management unit 130 is configured to obtain the current unbalance value VNB between the first phase current value IR, the second phase current value IS and the third phase current value IT.

The management unit 130 changes the operating quantities of the first power supply units PSU1 and PSU4, the second power supply units PSU2 and PSU5, and the third power supply units PSU3 and PSU6 in the server devices 110_1 to 110_n in response to the current unbalance value VNB being higher than a threshold VT.

It is worth mentioning here that in the case where the current unbalance value VNB is higher than the threshold VT, it means that the currents of the first phase power supply PR, the second phase power supply PS and the third phase power supply PT in the field FD are at an unbalanced state. Under such condition, the electric energy management system 10 changes the operating quantities of the first power supply units PSU1 and PSU4, the second power supply units PSU2 and PSU5, and the third power supply units PSU3 and PSU6 in the server devices 110_1 to 110_n to improve the balance of currents. For example, the management unit 130 will reduce the operating quantities of the first power supply units PSU1 and PSU4 in the server devices 110_1 to 110_n in response to the current unbalance value VNB being higher than the threshold VT and the first phase current value IR being the highest current value among the first phase current value IR, the second phase current value IS and the third phase current value IT. In another example, the management unit 130 increases the operating quantities of the first power supply units PSU1 and PSU4 in the server devices 110_1 to 110_n in response to the current unbalance value VNB being higher than the threshold VT and the first phase current value IR being the lowest current value among the first phase current value IR, the second phase current value IS and the third phase current value IT.

In an embodiment, the management unit 130 does not change the operating quantities of the first power supply units PSU1 and PSU4, the second power supply units PSU2 and PSU5, and the third power supply units PSU3 and PSU6 in the server devices 110_1 to 110_n in response to the current unbalance value VNB being lower than or equal to the threshold VT.

In an embodiment, each of the server devices 110_1 to 110_n further includes a switching circuit SWC. Each switching circuit SWC is coupled to the first power supply units PSU1 and PSU4, the second power supply units PSU2 and PSU5 and the third power supply units PSU3 and PSU6 in the corresponding server devices. The management unit 130 receives the current values supplied by the first power supply units PSU1 and PSU4, the current values supplied by the second power supply units PSU2 and PSU5, and the current values supplied by the third power supply units PSU3 and PSU6 through the switching circuit SWC. In addition, the management unit 130 controls the switching circuit SWC to deactivate or enable the first power supply units PSU1 and PSU4, the second power supply units PSU2 and PSU5, and the third power supply units PSU3 and PSU6.

In an embodiment, the sensing unit 120 may sense and receive the first phase current value IR, the second phase current value IS and the third phase current value IT at the power terminal of the field FD.

Figure 2:
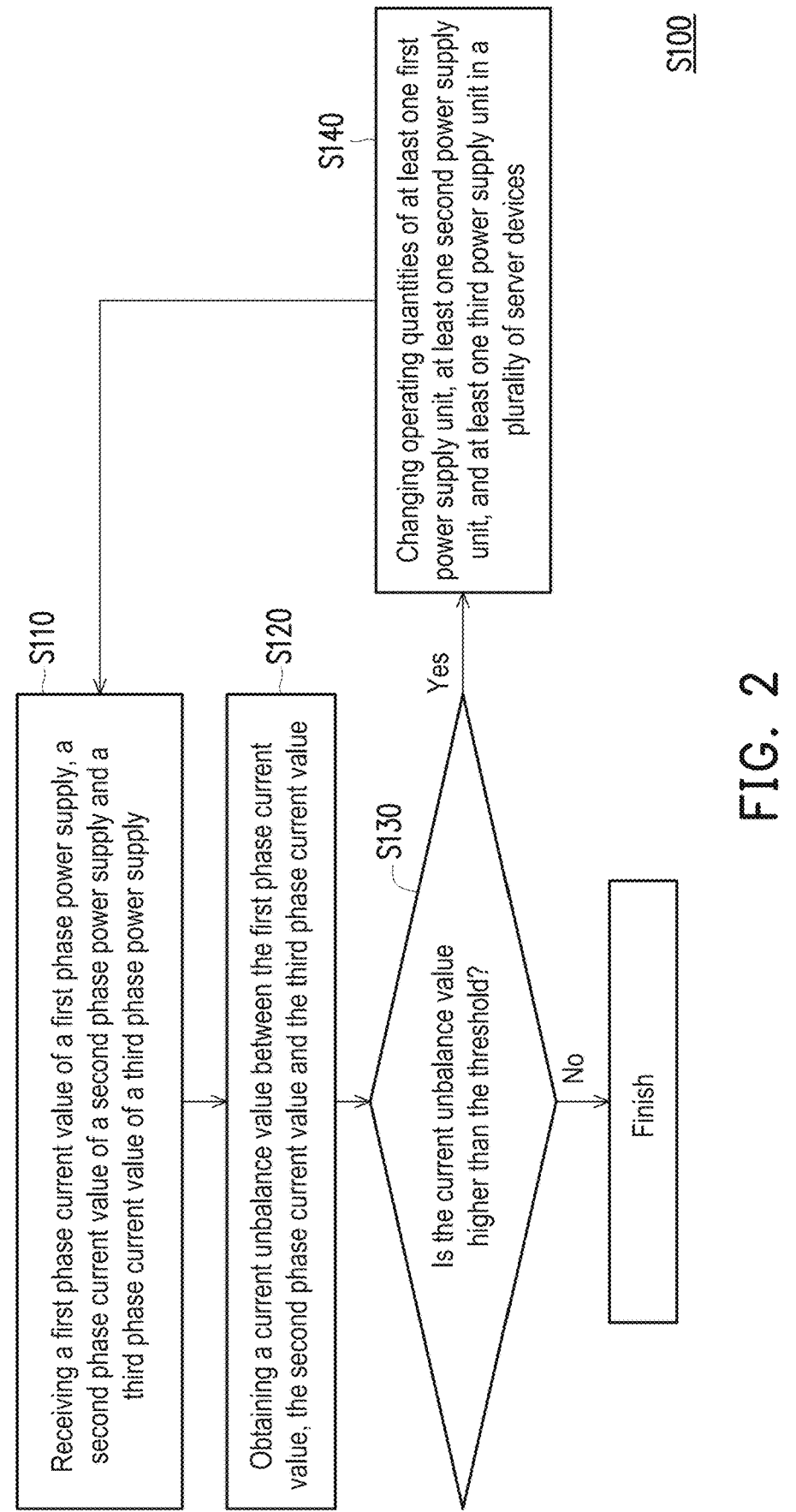
FIG. 2 is a flow chart of an electric energy management method according to an embodiment of the present disclosure.

Please refer to FIG. 1 and FIG. 2 simultaneously. FIG. 2 is a flow chart of an electric energy management method according to an embodiment of the present disclosure. In an embodiment, the electric energy management method S100 is provided to control the current balance of the field FD. The electric energy management method S100 includes steps S110 to S140. In step S110, the sensing unit 120 senses or receives the first phase current value IR of the first phase power supply PR, the second phase current value IS of the second phase power supply PS, and the third phase current value IT of the third phase power supply PT.

In step S120, the management unit 130 obtains the current unbalance value VNB between the first phase current value IR, the second phase current value IS and the third phase current value IT.

In step S130, the management unit 130 determines the current unbalance value VNB. The management unit 130 changes the operating quantities of the first power supply units PSU1 and PSU4, the second power supply units PSU2 and PSU5 and the third power supply units PSU3 and PSU6 in the server devices 110_1 to 110_*n* in step S140 in response to the current unbalance value VNB being higher than the threshold VT. Then the operation returns to step S110. Under such condition, the management unit 130 changes the operating quantities of the plurality of power supply units in the server devices 110_1 to 110_*n* in step S140 until the current unbalance value VNB is lower than or equal to the threshold VT.

On the other hand, the management unit 130 terminates the operation of the electric energy management method S100 in response to the current unbalance value VNB being lower than or equal to the threshold VT.

The implementation details of steps S110 to S140 have been clearly explained in the embodiment of FIG. 1, so no further details will not be repeated here.

Figure 3:
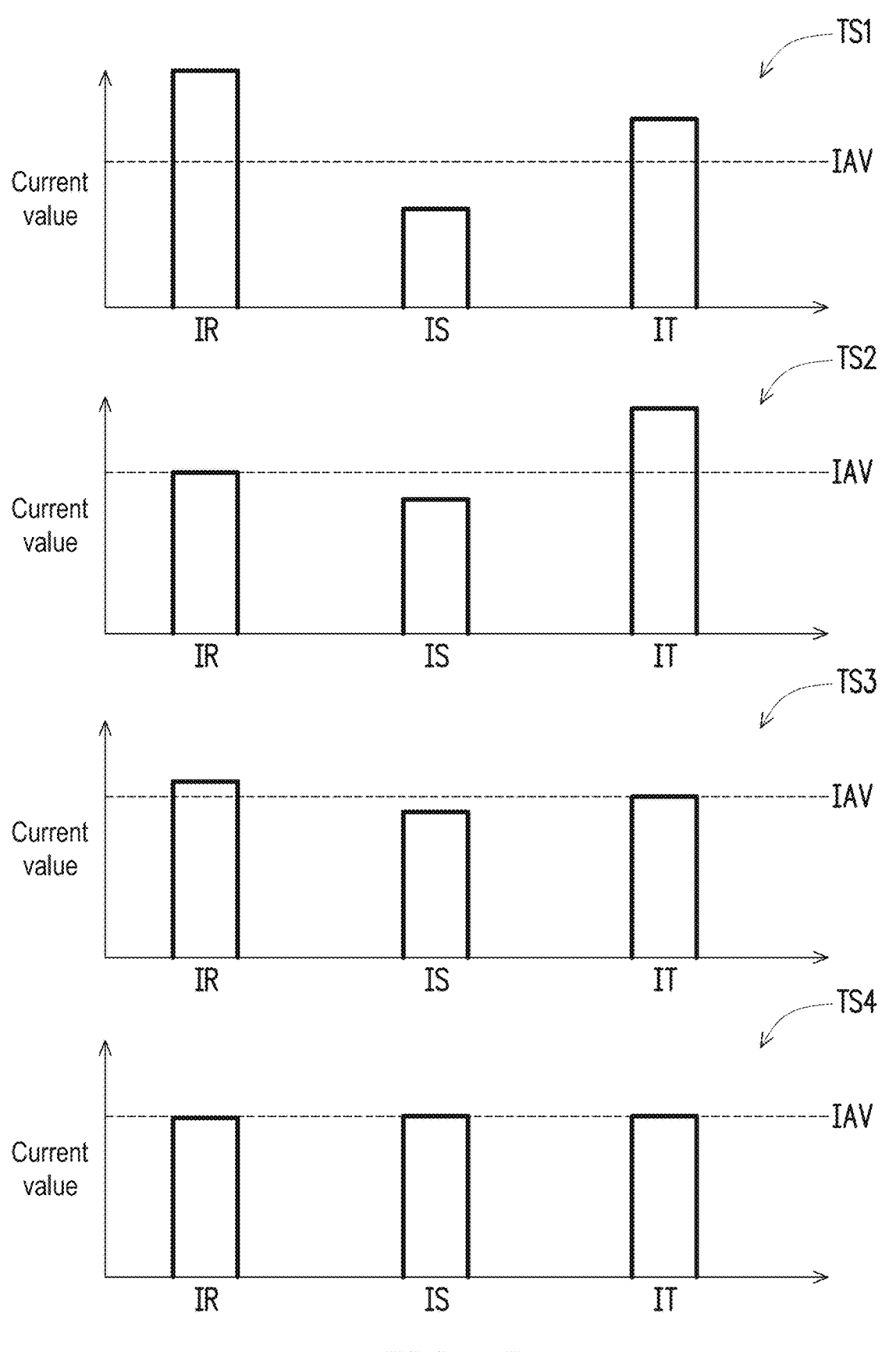
FIG. 3 is a schematic view of an operation according to an embodiment of the present disclosure.

Please refer to FIG. 1 and FIG. 3. FIG. 3 is a schematic view of an operation according to an embodiment of the present disclosure. For example, the threshold VT is 3.2%. The power consumption of the facility R1 is equal to 660 kilowatts (i.e., 660 kW). The power consumption of the facility R2 is equal to 440 kW. n equals to "100". In other words, the electric energy management system 10 includes 100 server devices 110_1 to 110_*n*. During the first period TS1, the power supply unit shelves of the server devices 110_1 to 110_*n* may respectively supply a maximum of 9 kW+9 kW of electric energy. It should be noted that the maximum load of a single server device is 9 kW, wherein "+9 kW" refers to redundant electric energy. The operating voltage value is, for example, 200 volts (V). Under such condition, in a single power supply unit shelf, the current value that may be supplied by the first power supply units PSU1 and PSU4, the second power supply units PSU2 and PSU5, and the third power supply units PSU3 and PSU6 is equal to 7.5 amps respectively (i.e., 9 kW/200V/6=7.5 A).

Under such condition, the server devices 110_1 to 110_*n* supply a total of 900 kW during the first period TS1. The total power consumption of the field FD during the first period TS1 is equal to 2000 kW.

In addition, the operating voltage value is, for example, 200 volts. Therefore, the total current value is equal to 10,000 amps (i.e., 10 kA). The total current value is equal to 10,000 amps (i.e., 10 kA). In ideal conditions, the first phase current value IR, the second phase current value IS and the third phase current value IT (root mean square value) are 3.33 kA respectively.

However, in fact, the first phase current value IR, the second phase current value IS and the third phase current value IT sensed by the sensing unit 120 are not consistent during the first period TS1. The first phase current value IR is equal to 4 kA during the first period TS1. The second phase current value IS is equal to 2.6 kA during the first period TS1. The third phase current value IT is equal to 3.4 kA during the first period TS1.

The management unit 130 may calculate the current unbalance value VNB between the first phase current value IR, the second phase current value IS and the third phase current value IT by using line current unbalance ratio (LIUR). The current unbalance value VNB is shown in formula (1).

$$VNB = \frac{I\max - IAV}{IAV} \times 100\% \qquad \text{Formula (1)}$$

In formula (1), "Imax" is the maximum current value among the first phase current value IR, the second phase current value IS and the third phase current value IT. "IAV" is the average current value of the first phase current value IR, the second phase current value IS and the third phase current value IT.

Based on formula (1), "Imax" is equal to 4 kA. "IAV" is equal to 3.33 kA. Therefore, the management unit 130 may calculate that the current unbalance value VNB in the first period TS1 is equal to 20.12%.

The management unit 130 may determine that the current unbalance value VNB (i.e., 20.12%) is higher than the threshold VT (i.e., 3.2%). Under such condition, the management unit 130 changes the operating quantities of the first power supply units PSU1 and PSU4, the second power supply units PSU2 and PSU5 and the third power supply units PSU3 and PSU6 in the server devices 110_1 to 110_*n* to improve the unbalanced currents in the first period TS1.

The management unit 130 may determine that the first phase current value IR is the maximum current value among the first phase current value IR, the second phase current value IS, and the third phase current value IT. Therefore, the management unit 130 calculates the reduced quantities of the first power supply units PSU1 and PSU4 according to the average current value IAV and the first phase current value IR.

In the example, the first power supply unit PSU4, the second power supply unit PSU5, and the third power supply unit PSU6 are respectively backup power supply units. The first phase current value IR is equal to 4 kA during the first period TS1. The average current value IAV is equal to 3.33 kA during the first period TS1. The first phase current value IR needs to be reduced by 0.67 kA. Therefore, the management unit 130 calculates that 90 first power supply units PSU1 and PSU4 need to be deactivated (i.e., 0.67 kA/7.5 A=89.33≈90). It should be noted that disabling the power supply unit PSU will allow the input average current to be evenly distributed to the other power supply units. To facilitate understanding, disabling the first power supply unit with an input current 7.5 A on the same server device means disabling 45 first power supply units PSU1 and PSU4 of the server device simultaneously.

After deactivating 90 first power supply units PSU1 and PSU4, the first phase current value IR drops to 3.3 kA in the second period TS2. The second phase current value IS and the third phase current value IT will increase by an average of 0.335 kA accordingly. Under such condition, the second phase current value IS rises to 2.935 kA during the second period TS2. The third phase current value IT rises to 3.735 kA during the second period TS2.

The management unit 130 may calculate the current unbalance value VNB in the second period TS2 by using LIUR. Based on the formula (1), "Imax" is equal to 3.735 kA. "IAV" is equal to 3.33 kA. Therefore, the management unit 130 may calculate that the current unbalance value VNB in the second period TS2 is equal to 12.16%.

The management unit 130 may determine that the current unbalance value VNB (i.e., 12.16%) is higher than the threshold VT (i.e., 3.2%). Under such condition, the management unit 130 will change the operating quantities of the first power supply units PSU1 and PSU4, the second power supply units PSU2 and PSU5 and the third power supply units PSU3 and PSU6 in the server racks 110_1 to 110_$n$ to improve the unbalanced currents in the second period TS2.

The management unit 130 may determine that the third phase current value IT is the maximum current value among the first phase current value IR, the second phase current value IS, and the third phase current value IT. Therefore, the management unit 130 calculates the reduced quantities of the third power supply units PSU3 and PSU6 based on the average current value IAV and the third phase current value IT.

In the example, the third phase current value IT is equal to 3.735 kA during the second period TS2. The average current value IAV is equal to 3.33 kA during the second period TS2. The third phase current value IT needs to be reduced by 0.405 kA. Therefore, the management unit 130 calculates that a total of 54 third power supply units PSU3 and PSU6 with an input current of 7.5 A need to be disabled (i.e., 0.405 kA/7.5 A≈54). It should be noted that in the meanwhile, 27 server devices disable the third power supply units PSU3 and PSU6. It should be noted here that, as the input current of the power supply unit PSU in the 45 server devices that deactivate the first power supply unit has been changed due to the above-mentioned deactivation, these 27 server devices are not the 45 server devices mentioned above that deactivate the first power supply unit.

After deactivating 54 third power supply units PSU6, the third phase current value IT drops to 3.3 kA in the third period TS3. The first phase current value IR and the second phase current value IS will increase by 0.2025 kA on average. Under such condition, the first phase current value IR rises to 3.5325 kA during the third period TS3. The second phase current value IS rises to 3.1375 kA during the third period TS3.

The management unit 130 may calculate the current unbalance value VNB during the third period TS3 by using LIUR. Based on the formula (1), "Imax" is equal to 3.5325 kA. "IAV" is equal to 3.33 kA. Therefore, the management unit 130 may calculate that the current unbalance value VNB in the third period TS3 is equal to 6.08%.

The management unit 130 may determine that the current unbalance value VNB (i.e., 6.08%) is higher than the threshold VT (i.e., 3.2%). Under such condition, the management unit 130 changes the operating quantities of the first power supply units PSU1 and PSU4, the second power supply units PSU2 and PSU5 and the third power supply units PSU3 and PSU6 in the server devices 110_1 to 110_$n$ to improve the unbalanced currents in the third period TS3.

The management unit 130 may determine that the first phase current value IR is the maximum current value among the first phase current value IR, the second phase current value IS, and the third phase current value IT. Therefore, the management unit 130 calculates the reduced quantities of the first power supply units PSU1 and PSU4 according to the average current value IAV and the first phase current value IR.

In the example, the first phase current value IR is equal to 3.5325 kA during the third period TS3. The average current value IAV is equal to 3.33 kA during the third period TS3. The first phase current value IR needs to be reduced by 0.2025 kA. Therefore, the management unit 130 calculates that 27 first power supply units PSU1 and PSU4 need to be deactivated (i.e., 0.2025 kA/7.5 A=27). In other words, 13 server devices disable the first power supply units PSU1 and PSU4 simultaneously. Moreover, an additional one of the first power supply units PSU1 and PSU4 with an input current of 7.5 A in a server device is disabled.

After deactivating 27 first power supply units PSU1 and PSU4, the first phase current value IR drops to 3.3 kA in the fourth period TS4. The second phase current value IS and the third phase current value IT will increase by 0.10125 kA on average. Under such condition, the second phase current value IS rises to 3.23875 kA during the fourth period TS4. The third phase current value IT rises to 3.43125 kA during the fourth period TS4. Based on the formula (1), "Imax" is equal to 3.43125 kA. "IAV" is equal to 3.33 kA. Therefore, the management unit 130 may calculate that the current unbalance value VNB in the fourth period TS4 is equal to 3.04%.

The management unit 130 may determine that the current unbalance value VNB (i.e., 3.04%) is lower than the threshold VT (i.e., 3.2%). Under such condition, the management unit 130 stops changing the operating quantities of the first power supply units PSU1 and PSU4, the second power supply units PSU2 and PSU5 and the third power supply units PSU3 and PSU6 in the server devices 110_1 to 110_$n$.

Based on the above operations, the current unbalance value VNB is reduced from 20.12% to 3.04%. The management unit 130 deactivates a total of 17 first power supply units PSU1, 54 third power supply units PSU6 and 100 first power supply units PSU4, that is, the first power supply units PSU1 and PSU4 in 58 server devices, one of the first power supply units PSU1 and PSU4 in 1 server device, as well as the third power supply units PSU3 and PSU6 in the 27 server devices are disabled, and the remaining power supply units continue to be operated.

Please refer to FIG. 1 and FIG. 4 at the same time. FIG. 4 is a schematic view of the calculation of the current value of the server device according to an embodiment of the present disclosure. In an embodiment, the management unit 130 receives the current values supplied by the first power supply units PSU1 and PSU4, the current values supplied by the second power supply units PSU2 and PSU5, and the current values supplied by the third power supply units PSU3 and PSU6 of the server devices 110_1 to 110_$n$ through the switching circuit SWC. Therefore, the management unit 130 tracks the status of the three-phase currents of the server devices 110_1 to 110_$n$.

In an embodiment, the power supply unit shelf of the server device 110_1 may, through the switching circuit SWC of the server device 110_1, supply the current value I1R1 supplied by the first power supply unit PSU1, the current value I1R2 supplied by the first power supply unit PSU4, the current value I1S1 supplied by the second power supply unit PSU2, the current value I1S2 supplied by the second power supply unit PSU5, the current value I1T1 supplied by the third power supply unit PSU3, and the current value I1T2 supplied by the third power supply unit PSU6 to the management unit 130. The power supply unit shelf of the server device 110_2 may, through the switching circuit SWC of the server device 110_2, supply the current value I2R1 supplied by the first power supply unit PSU1, the current value I2R2 supplied by the first power supply unit PSU4, the current value I2S1 supplied by the second power supply unit PSU2, the current value I2S2 supplied by the second power supply unit PSU5, the current value I2T1 supplied by the third power supply unit PSU3, and the current value I2T2 supplied by the third power supply unit PSU6 to the management unit 130. In the same way, the power supply unit shelf of the server device 110_n may, through the switching circuit SWC of the server device 110_n, supply the current value InR1 supplied by the first power supply unit PSU1, the current value InR2 supplied by the first power supply unit PSU4, the current value InS1 supplied by the second power supply unit PSU2, the current value InS2 supplied by the second power supply unit PSU5, the current value InT1 supplied by the third power supply unit PSU3, and the current value InT2 supplied by the third power supply unit PSU6 to the management unit 130.

In addition, the management unit 130 sums the current values I1R1, I1R2, I2R1, I2R2, . . . , InR1, InR2 to generate a first total current value ITR. The first total current value ITR is equal to the first phase current value of the IT facility. The management unit 130 sums the current values I1S1, I1S2, I2S1, I2S2, . . . , InS1, InS2 to generate a second total current value ITS. The second total current value ITS is equal to the second phase current value of the IT facility. The management unit 130 sums the current values I1T1, I1T2, I2T1, I2T2, . . . , InT1, InT2 to generate a third total current value ITT. The third total current value ITT is equal to the third current value of the IT facility.

Figure 5:
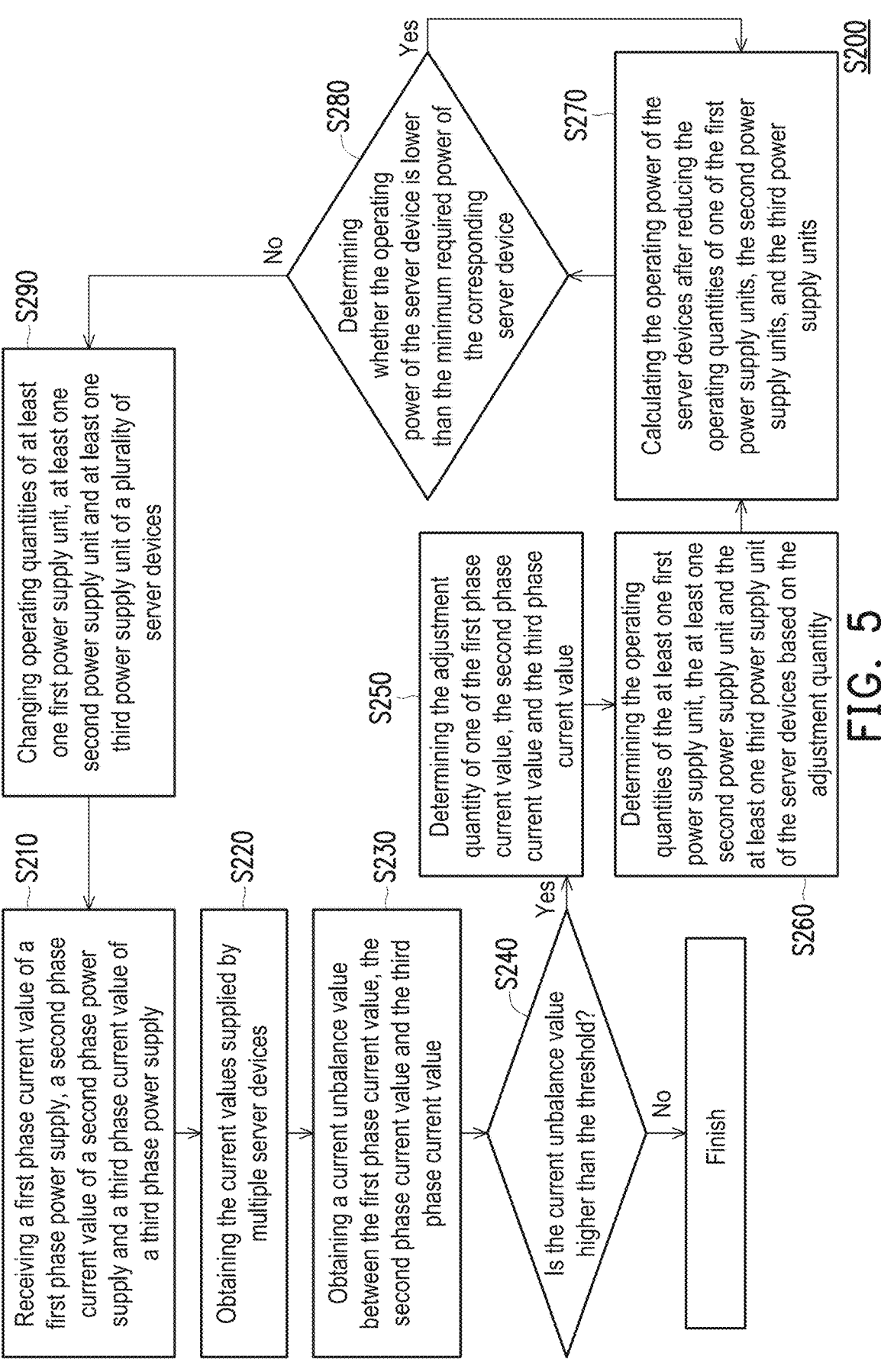
FIG. 5 is a flow chart of an electric energy management method according to an embodiment of the present disclosure.

Please refer to FIG. 1 and FIG. 5 simultaneously. FIG. 5 is a flow chart of an electric energy management method according to an embodiment of the present disclosure. In an embodiment, the electric energy management method S200 is provided to control the current balance of the field FD. The electric energy management method S200 includes steps S210 to S290. In step S210, the sensing unit 120 senses the first phase current value IR of the first phase power supply PR of the field FD, the second phase current value IS of the second phase power supply PS of the field FD, and the third phase current value IT of the third phase power supply PT of the field FD.

In step S220, the management unit 130 receives the current values supplied by the first power supply units PSU1 and PSU4 of the server devices 110_1 to 110_n, the current values supplied by the second power supply units PSU2 and PSU5, and the current values supplied by the third power supply units PSU3 and PSU6. The implementation details of step S220 have been clearly explained in the embodiment of FIG. 4 and will not be repeated here.

In step S230, the management unit 130 obtains the current unbalance value VNB between the first phase current value IR, the second phase current value IS and the third phase current value IT. The management unit 130 may obtain the current unbalance value VNB by using the formula (1).

In step S240, the management unit 130 determines the current unbalance value VNB. The management unit 130 terminates the operation of the electric energy management method S100 in response to the current unbalance value VNB being lower than or equal to the threshold VT.

On the other hand, the management unit 130 determines the adjustment quantity of one of the first phase current value IR, the second phase current value IS and the third phase current value IT in step S250 in response to the current unbalance value VNB being higher than the threshold VT, and determines the operating quantities of the first power supply units PSU1 and PSU4, the second power supply units PSU2 and PSU5 and the third power supply units PSU3 and PSU6 of the server devices 110_1 to 110_n based on the adjustment quantity in step S260. The implementation details of steps S250 and S260 have been clearly explained in the embodiments of FIG. 1 and FIG. 3 and will not be repeated here.

Next, in step S270, the management unit 130 calculates the operating power of the server devices 110_1 to 110_n after reducing the operating quantities of one of the first power supply units PSU1 and PSU4, the second power supply units PSU2 and PSU5, and the third power supply units PSU3 and PSU6.

In step S280, the management unit 130 determines the operating power. For example, in the condition where the operating power of the server device 110_1 is lower than the minimum required power of the server device 110_1, it means that the power supply for the server device 110_1 after reducing the operating quantities of the first power supply units PSU1 and PSU4 is not enough to drive the server device 110_1. Under such condition, in response to the operating power of the server device 110_1 being lower than the minimum required power of the server device 110_1, the management unit 130 stops reducing the operating quantities of the first power supply units PSU1 and PSU4 of the server device 110_1. Moreover, the management unit 130 will return to step S270 to change one of the operating quantities of the first power supply units PSU1 and PSU4, the second power supply units PSU2 and PSU5, and the third power supply units PSU3 and PSU6 in other ways, and calculate again the operating power of the server devices 110_1 to 110_n after reducing one of the operating quantities of the first power supply units PSU1 and PSU4, the second power supply units PSU2 and PSU5, and the third power supply units PSU3 and PSU6. For example, the management unit 130 increases the operating quantities of the second power supply units PSU2 and PSU5 and the third power supply units PSU3 and PSU6 of the server device 110_1, or decreases the operating quantities of the first power supply units PSU1 and PSU4 of the server device 110_2.

In the condition where the operating power of the server device 110_1 is higher than or equal to the minimum required power of the server device 110_1, it means that the power supply for the server device 110_1 after reducing the operating quantities of one of the first power supply units PSU1 and PSU4, the second power supply units PSU2 and PSU5 and the third power supply units PSU3 and PSU6 is sufficient to drive the server device 110_1. Under such condition, in response to the operating power of the server device 110_1 being higher than or equal to the minimum required power of the server device 110_1, the management unit 130 changes the operating quantities of multiple power supply units in the server devices 110_1 to 110_n based on the solution determined in step S270, and then return to the operation of step S210.

Figure 6:
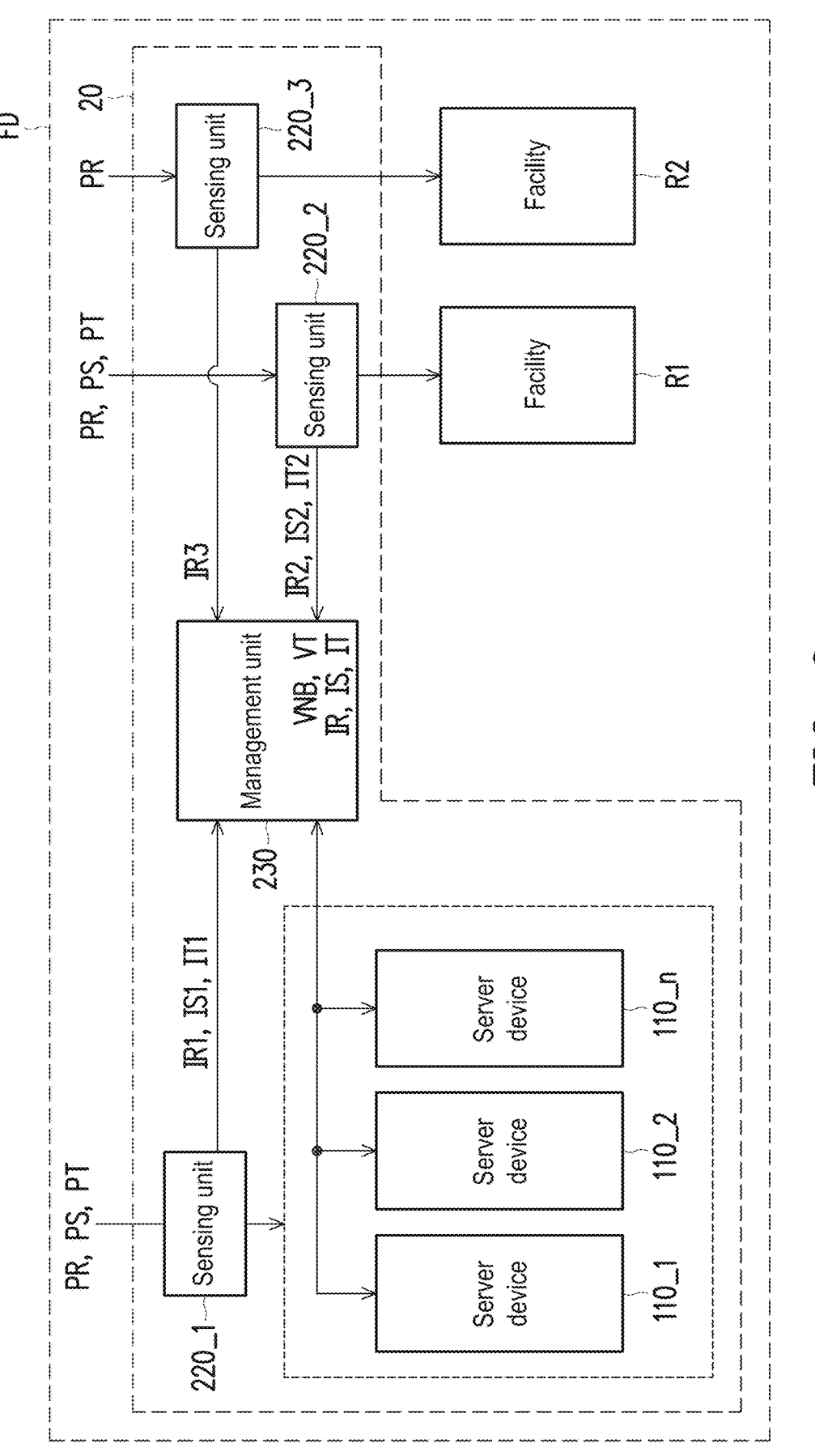
FIG. 6 is a schematic view of an electric energy management system according to an embodiment of the present disclosure.

Please refer to FIG. 6. FIG. 6 is a schematic view of an electric energy management system according to an embodiment of the present disclosure. In an embodiment, the electric energy management system 20 includes server devices 110_1 to 110_n, sensing units 220_1, 220_2, and 220_3 and a management unit 230. The implementation of the server devices 110_1 to 110_n has been clearly explained in the embodiment of FIG. 1 and will not be repeated here. In an embodiment, the server devices 110_1 to 110_n and the facility R1 are operated based on the first phase power supply PR, the second phase power supply PS, and the third phase power supply PT respectively. The facility R2 are respectively operated based on the first phase power supply PR. The sensing unit 220_1 senses the first phase current value IR1, the second phase current value IS1 and the third phase current value IT1 required by the server devices 110_1 to 110_n. The sensing unit 220_2 senses the first phase current value IR2, the second phase current value IS2 and the third phase current value IT2 required by the facility R1. The sensing unit 220_3 senses the first phase current value IR3 required by the facility R2.

The management unit 230 collects the first phase current values IR1, IR2, and IR3, the second phase current values IS1 and IS2 and the third phase current values IT1 and IT2. The management unit 230 sums the first phase current values IR1, IR2, and IR3 to generate the first phase current value IR. The management unit 230 sums the second phase current values IS1 and IS2 to generate the second phase current value IS. In addition, the management unit 230 sums the third phase current values IT1 and IT2 to generate the second phase current value IT.

Next, the management unit 230 obtains the current unbalance value VNB between the first phase current value IR, the second phase current value IS and the third phase current value IT, and determines whether to change the operating quantities of the first power supply units PSU1 and PSU4, the second power supply units PSU2 and PSU5, and the third power supply units PSU3 and PSU6 in the server devices 110_1 to 110_n based on the comparison result of the current unbalance value VNB and the threshold VT. The implementation details of the management unit 230 obtaining the current unbalance value VNB and changing the operating quantities of the first power supply units PSU1 and PSU4, the second power supply units PSU2 and PSU5, and the third power supply units PSU3 and PSU6 in the server devices 110_1 to 110_n have been clearly explained in the embodiments of FIG. 1 to FIG. 5, and no further details will not be repeated here.

To sum up, under the condition where the current unbalance value is higher than the threshold, it means that the currents of the first phase power supply, the second phase power supply and the third phase power supply of the field are in an unbalanced state. In such condition, the electric energy management system and the electric energy management method change the operating quantities of the plurality of first power supply units, the plurality of second power supply units and the plurality of third power supply units to improve the balance of the currents until current unbalance value is lower than or equal to the threshold. In this way, the currents of the first phase power supply, the second phase power supply and the third phase power supply of the field are in a balanced state.

Although the present disclosure has been disclosed above through embodiments, it is not intended to limit the present disclosure. Anyone with ordinary knowledge in the technical field can make some modifications and refinement without departing from the spirit and scope of the present disclosure. Therefore, the scope to be protected by the present disclosure shall be determined by the appended claims.

What is claimed is:

1. An electric energy management device for controlling a current balance, comprising:
   a sensing unit, disposed to sense a first phase current value, a second phase current value, and a third phase current value; and
   a management unit, coupled to the sensing unit and disposed to obtain a current unbalance value between the first phase current value, the second phase current value, and the third phase current value, wherein the management unit calculates the current unbalance value by using a line current unbalance ratio (LIUR) according to a maximum value among the first, second, and third phase current values and an average value of the first, second, and third phase current values, and to change operating quantities of at least one first power supply unit, at least one second power supply unit, and at least one third power supply unit of a plurality of server devices in response to the current unbalance value being higher than a threshold.

2. The electric energy management device according to claim 1, wherein the management unit reduces the operating quantities of the at least one first power supply unit in response to the current unbalance value being higher than the threshold and the first phase current value being a highest current value.

3. The electric energy management device according to claim 1, wherein
   the management unit calculates an average current value of the first phase current value, the second phase current value, and the third phase current value, and
   the management unit calculates reduced quantities of the at least one first power supply unit based on the average current value and the first phase current value in response to the current unbalance value being higher than the threshold and the first phase current value being a highest current value.

4. The electric energy management device according to claim 1, wherein the management unit calculates an operating power of the plurality of server devices after reducing the operating quantities of one of the at least one first power supply unit, the at least one second power supply unit, and the at least one third power supply unit in response to the current unbalance value being higher than threshold, and
   the management unit stops reducing the operating quantities of one of the at least one first power supply unit, the at least one second power supply unit, and the at least one third power supply unit in response to a first operating power of a first server device among the plurality of server devices being lower than a minimum required power of the first server device.

5. The electric energy management device according to claim 1, wherein the management unit increases the operating quantities of the at least one first power supply unit in response to the current unbalance value being higher than the threshold and the first phase current value being a lowest current value.

6. The electric energy management device according to claim 1, wherein the management unit receives a first current value supplied by the at least one first power supply unit, a second current value supplied by the at least one second power supply unit, and a third current value supplied by the at least one third power supply unit through a switching circuit.

7. The electric energy management device according to claim 6, wherein the management unit controls the switching circuit to disable or enable the at least one first power supply unit, the at least one second power supply unit and the at least one third power supply unit.

8. An electric energy management method for controlling a current balance, comprising:
   receiving a first phase current value, a second phase current value, and a third phase current value;

obtaining a current unbalance value between the first phase current value, the second phase current value, and the third phase current value, wherein the current unbalance value is calculated by using a line current unbalance ratio (LIUR) according to a maximum value among the first, second, and third phase current values and an average value of the first, second, and third phase current values; and changing operating quantities of at least one first power supply unit, at least one second power supply unit, and at least one third power supply unit in a plurality of server devices in response to the current unbalance value being higher than a threshold.

9. The electric energy management method according to claim 8, wherein the step of changing the operating quantities of the at least one first power supply unit, the at least one second power supply unit, and the at least one third power supply unit in the plurality of server devices in response to the current unbalance value being higher than the threshold comprises:

reducing the operating quantities of the at least one first power supply unit in response to the current unbalance value being higher than the threshold and the first phase current value being a highest current value.

10. The electric energy management method according to claim 8, wherein the step of changing the operating quantities of the at least one first power supply unit, the at least one second power supply unit, and the at least one third power supply unit in the plurality of server devices in response to the current unbalance value being higher than the threshold comprises:

calculating an average current value of the first phase current value, the second phase current value and the third phase current value; and calculating reduced quantities of the at least one first power supply unit based on the average current value and the first phase current value in response to the current unbalance value being higher than the threshold and the first phase current value being a highest current value.

11. The electric energy management method according to claim 8, further comprising:

calculating an operating power of the plurality of server devices after reducing the operating quantities of one of the at least one first power supply unit, the at least one second power supply unit, and the at least one third power supply unit in response to the current unbalance value being higher than threshold.

12. The electric energy management method according to claim 8, further comprising:

stopping reducing the operating quantities of one of the at least one first power supply unit, the at least one second power supply unit, and the at least one third power supply unit in response to a first operating power of a first server device among the plurality of server devices being lower than a minimum required power of the first server device.

13. The electric energy management method according to claim 8, wherein the step of changing the operating quantities of the at least one first power supply unit, the at least one second power supply unit, and the at least one third power supply unit in the plurality of server devices in response to the current unbalance value being higher than the threshold comprises:

increasing the operating quantities of the at least one first power supply unit in response to the current unbalance value being higher than the threshold and the first phase current value being a lowest current value.

14. An electric energy management system for controlling a current balance, comprising:

a plurality of server devices, comprising:

at least one first power supply unit, disposed to supply power by using a first phase power supply;

at least one second power supply unit, disposed to supply power by using a second phase power supply; and at least one third power supply unit, disposed to supply power by using a third phase power supply;

an electric energy management device, comprising:

a sensing unit, disposed to sense a first phase current value of the first phase power supply, a second phase current value of the second phase power supply, and a third phase current value of the third phase power supply; and a management unit, coupled to the sensing unit and disposed to obtain a current unbalance value between the first phase current value, the second phase current value, and the third phase current value, wherein the management unit calculates the current unbalance value by using a line current unbalance ratio (LIUR) according to a maximum value among the first, second, and third phase current values and an average value of the first, second, and third phase current values, and to change operating quantities of the at least one first power supply unit, the at least one second power supply unit and the at least one third power supply unit in the plurality of server devices in response to the current unbalance value being higher than a threshold.

15. The electric energy management system according to claim 14, wherein the management unit reduces the operating quantities of the at least one first power supply unit in response to the current unbalance value being higher than the threshold and the first phase current value being a highest current value; or the management unit increases the operating quantities of the at least one first power supply unit in response to the current unbalance value being higher than the threshold and the first phase current value being a lowest current value.

16. The electric energy management system according to claim 14, wherein the management unit calculates reduced quantities of the at least one first power supply unit based on the average current value and the first phase current value in response to the current unbalance value being higher than the threshold and the first phase current value being a highest current value.

17. The electric energy management system according to claim 14, wherein the management unit calculates an operating power of the plurality of server devices after reducing the operating quantities of one of the at least one first power supply unit, the at least one second power supply unit, and the at least one third power supply unit in response to the current unbalance value being higher than threshold, and the management unit stops reducing the operating quantities of one of the at least one first power supply unit, the at least one second power supply unit, and the at least one third power supply unit in response to a first operating power of a first server device among the plurality of server devices being lower than a minimum required power of the first server device.

18. The electric energy management system according to claim 14, wherein the management unit controls a switching circuit of the plurality of server devices to disable or enable the at least one first power supply unit, the at least one second power supply unit, and the at least one third power supply unit.

* * * * *